Figure 1:
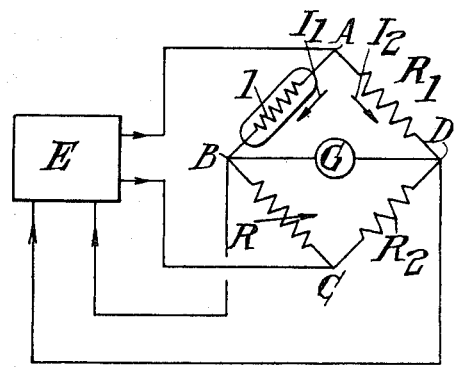

United States Patent
Loup et al.

[15] 3,676,771
[45] July 11, 1972

[54] METHOD FOR MEASUREMENT OF PARTIAL PRESSURES OF A GASEOUS SUBSTANCE USING A METALLIC COMPOUND OF THE GASEOUS SUBSTANCE

[72] Inventors: Jean-Pierre Olivier Loup, Olivet; Jacques Emile Gutknecht, L'Hay Les Roses; Anne-Marie Anthony, nee Barbier, Meudon, all of France

[73] Assignee: Agence Nationale De Valorisation De La Recherche (Anvar), Puteaux, France

[22] Filed: Dec. 30, 1969

[21] Appl. No.: 889,263

[30] Foreign Application Priority Data

Dec. 31, 1968 France...................................182836

[52] U.S. Cl................................................324/33
[51] Int. Cl.................................................G01n 27/62
[58] Field of Search.......................................324/33

[56] References Cited

UNITED STATES PATENTS 3,449,660  6/1969  Herb........................................324/33

Primary Examiner—Gerard R. Strecker
Attorney—Larson and Taylor

[57] ABSTRACT

Partial pressures ($P$) less than $10^{-3}$ atmospheres of $O_2$ or S are measured by placing a metallic oxide or sulfide compound in the atmosphere to be measured, bringing the compound to a temperature ($T$) and measuring its thermoelectronic emission ($J$) or its work function ($E\phi$). The equations then applied are $$\log J \quad K_1 - z \log P$$
$$E\phi = K_2 + zkT \log P$$

where $k$, $K_1$, and $K_2$ are constants and $z$ is a characteristic value of the defects of the structure of the compound.

3 Claims, 5 Drawing Figures

METHOD FOR MEASUREMENT OF PARTIAL PRESSURES OF A GASEOUS SUBSTANCE USING A METALLIC COMPOUND OF THE GASEOUS SUBSTANCE

The present invention relates to means for the measurement of low partial pressures of certain gaseous substances. More particularly, it relates to methods and to devices of the type for the measurement of low partial pressures, especially those which are less than $10^{-3}$ atmospheres, of gaseous substances of the type hereinafter called gaseous substances $A$, which are adapted to form metallic compounds, stable at a temperature $T$ such that the variation of the thermoelectronic emission or of the work function of these compounds as a function of the partial pressure of said gaseous substances is determined by the equilibrium of the gaseous substances with the defects of the structure of the compound.

By way of examples of gaseous substances $A$, there may be mentioned oxygen and sulphur; these structural defects of the corresponding metallic compounds, namely the oxides and the sulphides, are gaps and interstitial atoms.

It is a particular object of the invention to render the above-said means such that they respond better than hitherto to the various desiderata of practice.

According to the invention, there is provided a method, comprising placing the selected metallic compound of the gaseous substance $A$ in the midst of the atmosphere comprising the said substance $A$ under the partial pressure which has to be measured, bringing the said metallic compound to the temperature $T$ and measuring either its thermoelectronic emission $J$, or its work function $E\phi$, by means of which the value of the partial pressure sought is determined knowing that $J$ and $E\phi$ are connected with the partial pressure $P$ of the gaseous substance $A$ respectively by the equations:

$$\log J = K_1 - z \log P$$

$$E\phi = K_2 + zkT \log P$$

in which $k$, $K_1$ and $K_2$ are constants and $z$ is a characteristic value of the defects of the structure of the compound.

Figure 5:
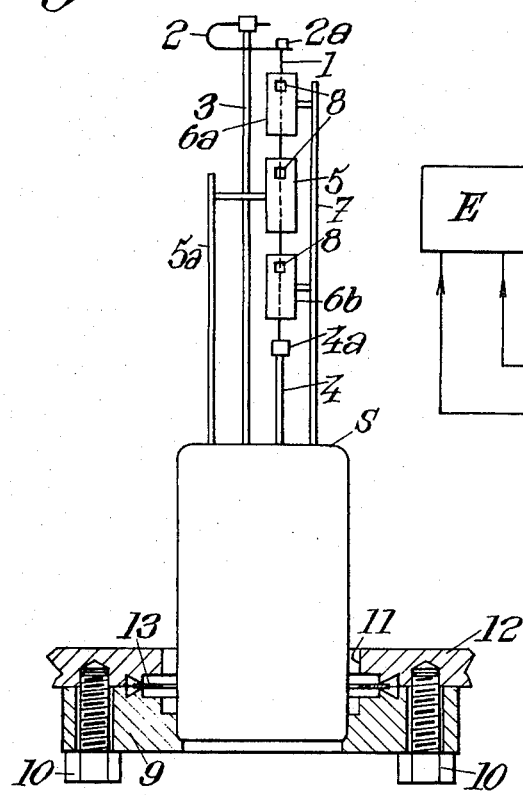
Figure 2:
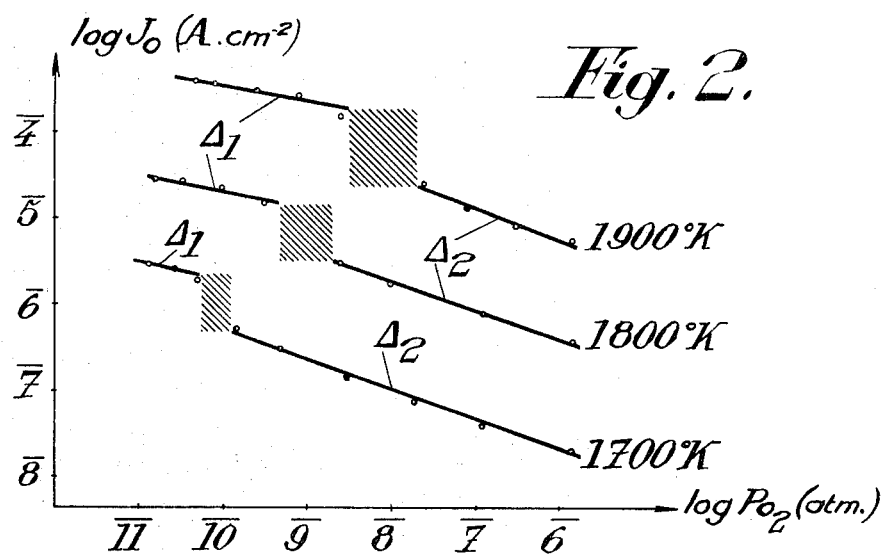
Figure 3:
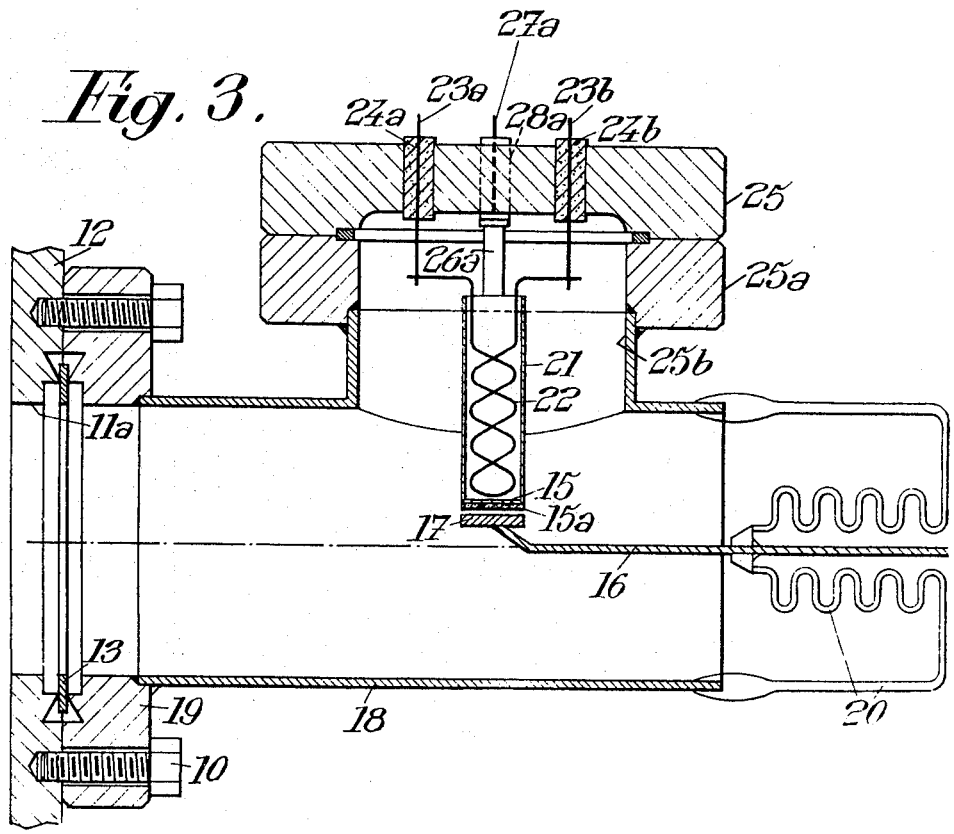
Figure 4:
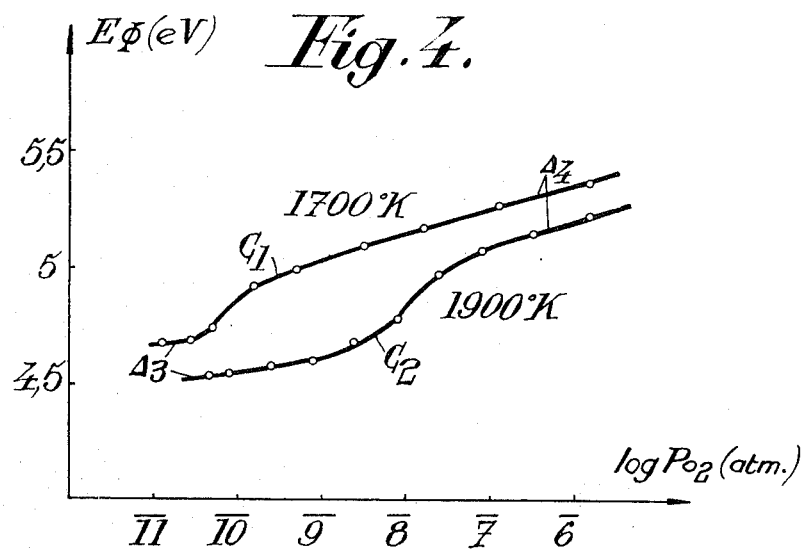

In order that the invention may be more easily understood, two embodiments of devices according to the invention are described below, purely by way of illustrative and non limiting examples, with reference to the accompanying drawings in which:

FIG. 1 and 3 show respectively a view in cross-section of said two embodiments; and FIGS. 2 and 4 respectively show corresponding diagrams for the application of the results of measurement obtained by means of the embodiments of FIGS. 1 and 3 respectively; and FIG. 5 is an electrical diagram corresponding to a portion of the embodiment of the device shown in FIG. 1.

According to the invention and more particularly according to those of its methods of application, as well as those of its methods of construction of its various parts which appear to be most advantageous, in order to measure the pressure of a gaseous substance of type $A$ which occurs under low pressure and which may be mixed with other gaseous substances, the procedure is a follows or in similar manner.

It is known that gaseous substances $A$ form metallic compounds for which the thermoelectonic emission at a temperature $T$ defined above, is governed by the law $$J = A \exp - E\phi/kT$$

in which $J$ represents the current density measured for a constant cathode-anode voltage, $A$ represents a constant and $E\phi$ "the work function" of the compound in question.

It is shown that the thermoelectronic emission $J$, on the one hand, and the work function $E\phi$ of the metallic compound considered, on the other hand, are connected with the partial pressure $P$ of the gaseous substance $A$ considered, by the relationship $$\log J = K_1 - z \log P \tag{1}$$

$$E\phi = K_2 + zkT \log P \tag{2}$$

in which $k$, $K_1$ and $K_2$ are constants and $z$ is a characteristic value of the defects of the structure of the compound considered.

Consequently, to know the partial pressure of a given gaseous substance $A$, according to the principal feature of the invention, the corresponding selected metallic compound is placed in the midst of the atmosphere containing the said gaseous substance, this compound is brought to the above said temperature $T$ and there is measured either its thermoelectronic emission $J$, or its work function $E\phi$. The value obtained is then applied in the corresponding equations indicated above to obtain the value of the partial pressure of the gaseous substance $A$ considered, the value of the magnitude $z$ being known in advance, or being determined at the time of the experiment.

From the practical point of view, the equations (1) and (2) are two straight lines of slope equal respectively to $-z$ and $zkT$.

If the absolute value of $z$ is known, it suffices to construct the straight lines representing equations (1) and (2) by determining a point on these straight lines ($J$ or $E\phi$ are measured for a known value of $P$) and by constructing through this point a straight line of slope $-z$ or $zkT$ according as it relates to $J$ or to $E\phi$.

If the absolute value of $z$ is not known, then the said straight lines are drawn experimentally, by determining at least two points.

Once in possession of the straight lines $\log J$ and $E\phi$ as a function of $\log P$, it suffices to measure either $J$ or $E\phi$ to know immediately the partial pressure of the gaseous substance by simply reading off the value of $J$ or $E\phi$ on the line in question.

In practice, it is recommended to construct these straight lines concerned by determining experimentally a relatively large number of points, the value of $z$ not being definable in the case of certain substances $A$ in passing from one pressure range to a neighboring pressure range.

This being the case, to further explain these features, there is described below the application of means according to the invention, for the measurement of low partial pressures of oxygen, the metallic compound used being zirconia.

The value of $J$ is determined, on the one hand, and that of $E\phi$, on the other hand, for a certain number of known partial pressures of oxygen, knowing that the temperature $T$ must be sufficient for the chemisorption of gases at the surface of the oxide does not modify the work function $E\phi$, so that the formulas $$\log J = K_1 - z \log P \tag{1}$$

$$E\phi = K_2 + zkT \log P \tag{2}$$

remain valid; in the case of zirconia, $T$ is taken as greater than 1,400°K; the above-said experiments are effected for example at 1,700°, 1,800° and 1,900°K as regards the measurement of $J$ and at 1,700° and 1,900°K as regards the value of $E\phi$.

As regards, first of all, the thermoelectronic emission, it is noted that for a given temperature, the value of $z$, in a certain range of partial pressures of oxygen is not definite and takes on both sides of this range a value $z_1$ and a value $z_2$ which form the straight line represented by $$\log J = K_1 - z \log P$$

comprising, in fact, two portions of straight lines $\Delta_1$ and $\Delta_2$ of slopes respectively equal to $-z_1$ and $-z_2$ and which are situated on both sides of the range of partial oxygen pressures in question.

By changing the temperature, this range is displaced, the portions of straight lines $\Delta_1$ and $\Delta_2$ being displaced parallel to themselves for the various values of $T$.

The value of $z_1$ is from + ⅓ (values of $J$ corresponding to partial pressures of oxygen greater than those which correspond to the above-said range) and the value of $z_2$ is from +

1/6 (values of $J$ corresponding to pressures less than those which correspond to the above-said range).

In the graph of FIG. 2, there is shown the portions of the straight lines concerned for temperatures of 1,700°, 1,800° and 1,900°K and, in the table below, there are collected the values $z_1$ and $z_2$ which are taken by $z$ according to the temperature at which the measurement is effected and according to the value of the pressure to be measured.

| $P_{O_2}$ (atm.) | 1900° K | 1800° K | 1700° K |
| --- | --- | --- | --- |
| $10^{-6}$ | | | |
| $10^{-7}$ | +⅓ | +⅓ | +⅓ |
| $10^{-8}$ | +⅓ | +⅓ | +⅓ |
| $10^{-9}$ | | +⅓ | +⅓ |
| $10^{-10}$ | +1/6 | | +⅓ |
| $10^{-11}$ | +1/6 | +1/6 | |
| $10^{-12}$ | +1/6 | +1/6 | +1/6 |

It is obvious that, in the case where there is selected a given experimental temperature for which the value $J$ to be measured corresponds to a partial pressure of oxygen for which the value of $z$ is not definite (hatched ranges, preceding table and FIG. 2) it suffices to recommence the experiment by making the temperature vary and by placing it, consequently, outside the said range.

It would, of course, also be possible to determine by a large number of experiments the nature of the curve connecting the portions of straight lines $\Delta_1$ and $\Delta_2$.

As regards, now, the variation of $E\phi$ as a function of the partial pressure of the oxygen, the above-said experiments show that there again, at a given temperature, $z$ is not definite for certain ranges of partial pressure of oxygen and passes from a value $z_3$ to a value $z_4$.

It follows that here again the straight line representing the function $$E\phi = K_2 + zkT \log P$$

is composed in fact of two portions of straight lines $\Delta_3$ and $\Delta_4$ of slopes respectively equal to $z_3 kT$ and $z_4 kT$, connected by a curve, namely $C_1$ at the temperature of 1,700°K and $C_2$ for 1,900°K (these curves have been determined for a large number of measurements); $z_3$ is equal to 1/6 and $z_4$ to ⅓.

In the graph of FIG. 4, there is shown the straight lines $\Delta_3$ and $\Delta_4$ for temperatures of 1,700° and 1,900°K as well as the corresponding curves $C_1$ and $C_2$.

This being the case, there is given below the description of two embodiments of devices enabling respectively the measurement of $J$ and the measurement of $E\phi$.

As regards first of all the device for measuring $J$, it comprises essentially means adapted to bring the metallic compound of the gaseous body of which it is desired to measure the pressure into the midst of the atmosphere comprising this gaseous substance, means for heating this compound and for regulation of the temperature of the compound and means for detecting the electrons emitted by this compound as well as means for measuring the electric current created.

In the advantageous embodiment shown in FIG. 1, the selected compound—in this instance zirconia which has been retained for the measurement of low oxygen pressures—is deposited as a thin layer on a filament or ribbon 1, formed of a metal which is not oxidized in the conditions of the experiment (for example of Pt, Ir or Rh) and heated by the Joule effect (it is also possible to provide means of indirect heating or by electronic bombardment, in this latter case zirconia is preferred in the form of a pastille).

During the experiment, the temperature of the zirconia and consequently of the filament must be strictly constant. Now, any modification of the oxygen pressure involve variations in the temperature of the filament when the latter is supplied under constant voltage intensity or power.

Consequently, to be sure that the temperature of the filament is constant, it is advantageous to mount it in a Wheatstone bridge of which the zeroing apparatus controls variations in the voltage of the generator of the direct current supply to the said filament.

In FIG. 5, there is shown diagrammatically the circuit thus obtained, the source of direct current which feeds the bridge at $A$ and $C$ being shown at $E$, $R$ being the variable resistance and $R_1$ and $R_2$ the two fixed resistances of the bridge, $G$ being the zeroing apparatus connected between B and D. The filament 1 and the fixed resistance $R_1$ are traversed by currents $I_1$ and $I_2$ respectively.

If $T_f$ is the temperature that it is desired to obtain and if $r_f$ is the corresponding resistance of the filament, it is known that the equilibrium of the bridge is achieved when $$r_f = R(R_1/R_2)$$

no current passing between B and D.

If the temperature of the filament drops below $T_f$, the resistance of the filament varies, the bridge is no longer balanced; the voltage which is then established between B and D acts on $E$ to increase the voltage $E = V_{AC}$. The current $I_1$ increases and causes heating of the filament of which the resistance returns to $r_f$ when the temperature is brought back to $T_f$ the bridge then being again balanced.

To give an idea of the magnitudes, it is indicated that the thickness of the zirconia layer, which is deposited on the filament 1 by electrophoresis or any other method (for example by spraying by a blow pipe or by spray gun, by sedimentation, by centrifugation or by paint brush), is advantageously of the order of 50 microns, the average size of the grains being of the order of a micron.

The filament or ribbon 1 is held taut, to compensate for expansions due to heating, by elastic means.

In the embodiment shown, the elastic means are constituted by a spring 2 of which one of the ends is fixed on a metallic support or rod 3 and of which the other end comprises a gripping member 2a in which is held one of the ends of the filament 1. The other end of the filament 1 is held by a gripping member 4a borne on a metallic support or rod 4.

The supports 3 and 4, by which the filament is fed with electric current, are mounted on a common support S, in the form of a tube (closed at those of its ends through which it carries the rods 3 and 4) for example of glass which they pass through in sealed manner by glass-metal passages.

The electron emitter deposit of zirconia plays, under the conditions of the experiment, the role of a cathode. To detect the electrons that it emits, recourse may be had, as shown in the drawing, to a cylindrical anode 5 which surrounds the middle portion of the filament and which is carried by a metal rod 5a borne by the support S and passing through it like supports 3 and 4. Inside the support S, the rods 3 and 4 are connected to a source of electric current and the rod 5a is connected to a voltage source selected so that the potential difference between the zirconia borne by the filament 1 and the anode 5 is of the order of 5 to 200 volts.

To eliminate interference effects of the electrons which are emitted by the ends of the zirconia deposit and thus to define better the lines of the electric field, there is preferably provided, on both sides of the anode 5, guard anodes 6a and 6b of constitution similar to that of the anode 5 and borne by a common rod 7 of metal which is mounted on a common support S and which penetrates inside the support S through a "glass-metal" passage to be connected to the source of the potential to which the anode 5 is already connected.

Between the filament 1, on the one hand, and the anode 5, on the other hand, are arranged measuring means not shown, enabling the current produced by the emission of the electrons on the part of the zirconia to be shown and measured, that is to say enabling the measurement of the value of $J$, the voltage difference between the anode and the cathode being held constant by means of a stabilized supply providing direct current.

It may be convenient to provide openings 8 in the anodes 4, 6a and 6b to measure the temperature of the filament by optical sighting.

The common support S is mounted, at its open end, for example by glass-metal welding, on an annular clamp 9, for example of stainless steel, including fixing means, for example bolts 10 to mount the assembly in a hole 11 provided in a wall 12 which bounds the enclosure containing the atmosphere studied.

The sealing between the clamp 11 and the wall 12 may be ensured by a metallic joint 13, for example of copper, clamped between two "blades" included respectively by the clamp and the wall 12 as shown in the drawing.

By means of the device thus constructed and of the diagram of FIG. 2, there may be measured partial pressures of oxygen less than $10^{-3}$ atmospheres and down to $10^{-12}$ atmospheres and even less.

As regards, now, the measurement of the variation of the work function $E\phi$ of zirconia, recourse may be had to numerous methods known in themselves.

Hereafter, with reference to FIG. 3, there is described a device applying that known as "vibrating condenser."

In this device, there is provided, on the one hand, a flat cathode 15 covered by a layer 15a of zirconia heated by indirect heating and, on the other hand, a flat electrode 17, of gold, arranged opposite the cathode 15, as shown, and borne on a support 16. The support 16 is connected to an electromagnetic vibrator not shown which enables the electrode 17 to be placed in vibration along a direction perpendicular to its plane.

The two electrodes 15 and 17 are arranged inside a box 18 vacum-tight and open at one of its ends through which it is fixed on a clamp 19, of stainless steel, which can be fixed as in the device of FIG. 1 on the wall 12 of an enclosure containing the atmosphere to be studied. The sealing may be ensured by a seal 13 of copper, as previously clamped between two "blades" (see Figure). After mounting, the inside of the box 18 communicates with the inside of the enclosure defined by the wall 12.

To enable the vibration of the electrode 17, its support 16 is made to be carried through a glass bellows 20 fixed on the box 18, for example by a glass-metal weld.

To ensure the indirect heating of the cathode 15, there may be arranged at the end of a tube 21 inside of which is housed a heating filament 22 covered with an insulant for example alumina. The filament 22 is connected to a source of current, not shown, by two wires 23a and 23b. The wires 23a and 23b pass through, by means of the insulating passages 24a and 24b, a flat removable plate 25, fixed in sealed manner, as shown, on a flange 25a borne by an opening 25b of the box 18.

The tube 21 is borne by the plate 25 as shown by means of two fixing lugs 26a and 26b (only the lug 26a is visible) which are connected to the exterior by two wires 27a and 27b passing through the plate by means of insulating passages 28a and 28b (the lugs 26a and 26b are fixed against the insulating passages 28a and 28b).

The temperature of the cathode 15 having to be held strictly constant, it may be made so that the wire 22 is one of the branches of a Wheatstone bridge in an assembly similar to that described with regard to FIG. 1.

According to the principle of the vibrating condenser method—the cathode 15 being brought to the temperature $T$, the electrode 17 being subjected to a vibration of the order of some hundreds of cycles per second and the atmosphere enclosed in the box 18 containing oxygen under low pressure that it is desired to measure—an electric current of displacement between the cathode 15 and the electrode 17 is detected in the outer circuit if the work function of the zirconia of the cathode 15 is different from that of the electrode 17.

By means of a variable D.C. source not shown, the potential of the electrode 17 with respect to that of the cathode 15 is then made to vary and, when the conditions are achieved for which there holds the equation "work function of $ZrO_2$ (cathode 15) = work function of gold (electrode 17) + external voltage"
current is no longer detected in the external circuit.

The work function of gold being known as well as the applied external voltage, the value of the work function of the zirconia is then immediately available.

By means of the device thus described and of the diagram of FIG. 4, oxygen pressures of less than $10^{-3}$ atmospheres and down to $10^{-12}$ atmospheres and even less are measured.

As a result and whatever the embodiment adapted, methods and means are thus provided for the measurement of low pressures of certain gaseous substances of which the characteristics and the operation emerge sufficiently from the preceding description for further explanation to be unnecessary and which have, with respect to those previously existing, numerous advantages.

We claim:

1. A method for the measurement of low partial pressures, especially those which are below $10^{-3}$ atmospheres of gaseous substances of the type of those called gaseous substances $A$ which are adapted to form metallic compounds, stable at a temperature $T$ such that the variation of the thermoelectronic emission or of the work function of these compounds as a function of the partial pressure of the said gaseous substance is determined by the equilibrium of the gaseous substance with the defects of the structure of the compound, said method comprising placing a selected metallic compound of the gaseous substance $A$ in the midst of an atmosphere containing the said substance $A$ under the partial pressure which is to be measured, bringing the said metallic compound to the temperature $T$ and measuring either its thermoelectronic emission $J$, or its work function $E\phi$, and determining the value of the partial pressure sought knowing that $J$ and $E\phi$ are connected with the partial pressure $P$ of the gaseous substance $A$ respectively by the equations:

$$\log J = K_1 - z \log P$$

$$E\phi = K_2 + zkT \log P$$

in which, $k$, $K_1$ and $K_2$ are constants and $z$ is a characteristic value of the defects of the structure of the compound.

2. A method according to claim 1, including constructing experimentally, for certain temperatures, the straight lines representing respectively the variations of $\log J$ and $E\phi$ as a function of $\log P$ and, after measuring either $J$, or $E\phi$, plotting the corresponding value on the graph representing the abovesaid lines to determine the pressure sought.

3. A method according to claim 1, including measuring low pressures of oxygen by using zirconia at a temperature $T$ greater than 1,400°K, the absolute value of $z$ being equal to 1/6 on one side and to 1/3 on the other side of a zone of partial pressure for which $z$ is not definite.

* * * * *